Patented July 13, 1943

2,323,938

UNITED STATES PATENT OFFICE 2,323,938

PRODUCT AND SYNTHESIS THEREOF

John Carl Sauer, Wilmington, Del., assignor to E. I. du Pont de Nemours & Company, Wilmington, Del., a corporation of Delaware No Drawing. Application July 25, 1940, Serial No. 347,555

10 Claims. (Cl. 260—561)

This invention relates to new compositions of matter and more particularly to amides and their preparation.

This application is a continuation-in-part of my copending applications Serial Nos. 234,843 and 234,844, filed October 13, 1938.

Amides are of use as intermediates in a number of chemical syntheses, and certain long chain amides are excellent intermediates for the preparation of water repellents, textile finishing agents, bactericides, and the like. Long chain, high molecular weight acids or related compounds from which these amides could be formed are limited definitely as to number and availability, particularly when a high molecular weight is desired.

This invention has as an object the preparation of new amides. A further object is the provision of a new process for this purpose. Other objects will appear hereinafter.

These objects are accomplished by the following invention wherein an alpha acyl ethenone having at least thirteen carbon atoms is reacted with a basic compound having at least one hydrogen on ammonia type nitrogen.

In the preferred practice of this invention beta-ketocarbonamides are prepared by adding anhydrous ammonia or anhydrous amines, bearing at least one amino hydrogen atom, to a solution, in an inert solvent, of an alpha acyl ethenone. The alpha acyl ethenone may be prepared, as disclosed in my copending applications Serial Nos. 234,843 and 234,844 (now U. S. Patent 2,238,826) by the reaction of a tertiary amine, e. g., triethylamine, and at least one primary acid halide, i. e., one containing the acid halide group —CO—X attached to a carbon bearing at least two hydrogen atoms, in an inert anhydrous solvent at room temperature. Removal of the tertiary amine hydrochloride by indirect filtering after the reactants have stood from 12 to 24 hours gives a solution of the acyl ethenone. The acyl ethenones must be prepared under anhydrous conditions and maintained in an anhydrous environment until used. The acyl ethenones suitable for the purpose of this invention have at least thirteen carbon atoms and have the formula

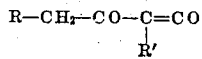

R being a monovalent organic radical which, from the method of preparation, is chemically inert at temperatures up to 170° C. to tertiary amines, acid halides and ethenones. R is preferably a hydrocarbon radical such as aryl, aralkyl, cycloalkyl and open chain alkyl but may contain inert groups such as carbalkoxy, alkoxy, aryloxy, aralkoxy, keto, tertiary amide, halogen attached to aromatic carbon or aliphatic heterocyclic groups. R' may be hydrogen but, in view of the method of preparation of the acyl ethenones, is preferably a monovalent organic radical with the chemical inertness of R and preferably hydrocarbon. R may be the same as R' or may be different. An especially preferred class of ethenones is that wherein R and R' are open chain alkyl. R and R' must total at least nine and for one of the most important fields of usefulness, the waterproofing field, preferably total at least twenty.

Amides are prepared from these acyl ethenones, in the preferred practice of the invention, by adding the basic compound containing hydrogen on ammonia type nitrogen to the acyl ethenone of at least thirteen carbon atoms in an inert solvent therefor. Reaction generally proceeds rapidly with the generation of some heat, and generally the amide precipitates from the solution from which it is filtered and is purified by recrystallization from a suitable solvent. In some cases the resulting amide is soluble in the solvent in which it is prepared. In these instances the solvent is removed at low temperature under diminished pressure and the resulting amide is recrystallized from a suitable solvent. Since the acyl ethenones are usually prepared in solutions of 5 to 10 per cent concentration, these solutions are generally used as such in the preparation of the amides. The solutions, however, can be concentrated by removing the solvent at low temperatures under reduced pressure, or all the solvent can be removed in this manner before reacting the acyl ethenone with ammonia or a suitable amine. This, however, is not as satisfactory as when a solvent is used.

A particularly useful class of products coming within the broad scope of this invention, namely that of amides containing at least one hydrogen atom on the amide nitrogen may be prepared by the reaction of acyl ethenones on basic compounds having two hydrogens on the same ammonia type nitrogen and are useful intermediates for the synthesis of water repellent materials and related products. Synthesis of water repellent materials, as outlined in Example I below, is effected by condensing the beta-ketocarbonamide with paraformaldehyde and an anhydrous hydrohalogen acid in an inert solvent, and subsequently reacting the isolated amidomethyl halide with a tertiary amine.

The more detailed practice of the invention is illustrated by the following examples, wherein parts given are by weight. There are of course many forms of the invention other than these specific embodiments.

*Example I*

A mixture of eicosanoic and docosanoic acids, available commercially from the hydrogenation of fish oils, is converted to the acid chlorides which are converted to the acyl ethenones in the following manner. The twice distilled $C_{20-22}$ acid chlorides (51 parts) are dissolved in anhydrous benzene (880 parts) and an equivalent of triethylamine (16.5 parts) is added. The mixture is allowed to stand for 20 hours at room temperature and then filtered. A total of 21 parts of triethylamine hydrochloride is separated by this filtration. The reaction for simplicity is represented as follows:

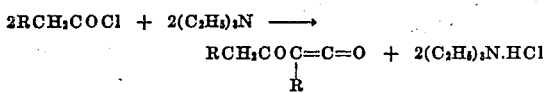

$$2RCH_2COCl + 2(C_2H_5)_3N \longrightarrow$$
$$RCH_2COC=C=O + 2(C_2H_5)_3N.HCl$$
$$\overset{|}{R}$$

The product is a mixture of acyl ethenones wherein the two R's are the same or different, the R's having 18 and 20 carbon atoms.

To a solution of 45 parts of the acyl ethenone mixture in anhydrous benzene (7,040 parts) is added hexamethylenediamine (54 parts). After the mixture has stood for several hours to insure complete reaction, an additional 100 parts of hexamethylenediamine is added. The reactor vessel is then set aside at room temperature overnight during which time the reaction product crystallizes from the solution. A yield of 45% of the theory of purified product is obtained. The product is represented by the formula

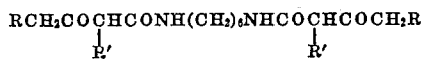

$$RCH_2COCHCONH(CH_2)_6NHCOCHCOCH_2R$$
$$\overset{|}{R'} \qquad \overset{|}{R'}$$

in which R and R' contain 18 or 20 carbon atoms and are alike or different. The melting point of the product is 88–93° C.

To the amide (205 parts) in dry benzene (1100 parts) is added paraformaldehyde (18 parts). The mixture is stirred at 50 to 60° C. for 2.5 hours while a stream of dry hydrogen chloride is bubbled through the reaction mixture. After separation of the water layer, the benzene is removed under reduced pressure at 40° C. until only the chloromethyl derivative is left. Dry pyridine in excess is added until an homogeneous solution results upon being stirred. Most of the excess pyridine is removed under reduced pressure and the last traces removed in a vacuum desiccating compartment.

A portion of the product which comprises chiefly the amidomethylpyridinium chloride salt, is analyzed for active ingredient content by the following method. To a weighed sample of the product is added ice and methanol and the cold solution is titrated with alkali immediately. This analysis determines what portion of the chlorine is present as pyridine hydrochloride. A second weighed sample dissolved in methanol is heated at reflux temperature from 3 to 24 hours and then titrated with alkali. The heating step converts all the quaternary ammonium salt to pyridine hydrochloride and the titration with standard alkali gives the total chlorine content. The difference between the total chlorine present and the chlorine present as pyridine hydrochloride gives the "active ingredient" content. In this case it is 83 per cent.

The water repelling agent (5 parts) is pasted with ethanol (6 parts) at 40–43° C. Water (90 parts) at 40–43° C. is added with stirring, and sodium acetate (2 parts) in water (4 parts) at 40–43° C. is added to produce a pH of approximately 5. A piece of cotton jean cloth is dipped into the solution, squeezed through rollers, and the process repeated. The wet cloth weighs approximately twice its dry weight. It is then dried by circulating warm dry air over it, and finally baked at 150° C. for 5 minutes. In examining the water repellent properties of the finished fabric by the spray test the following results are obtained:

| Repellency | |
|---|---|
| Initial | Laundered |
| 85 | 80 |

A cloth having a repellency of 100 will, when inclined at a 45° angle, completely repel 250 cc. of water at 80° F. sprayed from a height of 6 inches directly above, and none will cling to the cloth. A repellency of 90 means that a few drops of water cling to the cloth but can be completely removed by shaking. A repellency of 50 means that the upper surface of the cloth is wetted under the experimental conditions, but the water does not penetrate the cloth.

The laundering treatment consists in boiling the sample in a 0.1% soap solution for one hour, rinsing thoroughly and drying.

*Example II*

The acid chlorides of the mixture of eicosanoic and docosanoic acids are converted to the acyl ethenones as illustrated in Example I. The acyl ethenones are converted to the corresponding amides by bubbling anhydrous ammonia through the benzene solution of the ethenones. (Carbon tetrachloride solutions may also be used.) The benzene solution is chilled, filtered, and the precipitate recrystallized from aqueous ethanol. The melting point is 94–97° C. Analysis of the product showed 2.5% N as compared with 2.3% N calculated for $C_{42}H_{83}O_2N$. The product has the general formula

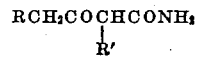

$$RCH_2COCHCONH_2$$
$$\overset{|}{R'}$$

in which R and R' contain 18 or 20 carbon atoms and are alike or different.

To these amides (170 parts) in dry benzene (970 parts) is added paraformaldehyde (22 parts) and a stream of dry hydrogen chloride is bubbled into the reaction mixture with constant stirring for a period of 2.5 hours. The reaction mixture is maintained at a temperature of 55–60° C. The water layer is separated and the benzene removed under reduced pressure. After removal of the solvent, the material is melted on the steam bath and pyridine (43 parts) is added with rapid stirring and cooling. After the excess pyridine has been removed under reduced pressure a sample is analyzed for chlorine and found to contain 6.6% whereas the value calculated for

$$C_{41}H_{42}O_2NCl$$

is 5.7.

Analysis of "active ingredient" content shows a value of 40 per cent.

The amidomethylpyridinium salt (6 parts), obtained as described above, is pasted with ethanol (5 parts) at 40 to 43° C. Water (90 parts) at 40-43° C. is added with stirring. Sodium acetate (2 parts) in water (4 parts) at 40-43° C. is added to give a pH of approximately 5. This solution contains 2.4% of "active ingredient."

The following experiment is run in duplicate: A piece of cotton jean cloth is dipped into the solution and allowed to become saturated, wrung in a mechanical wringer and the process repeated. The weight of the wet cloth is twice its dry weight. It is dried and baked for 5 minutes at 150° C. The results of spray tests made on the two samples are as follows:

|   | Repellency | |
|---|---|---|
|   | Initial | Laundered |
| 1 | 100 | 100 |
| 2 | 100 | 100 |

*Example III*

Octadecen-9-oic acid chloride is converted to the acyl ethenone by adding triethylamine (63.2 parts) to octadecen-9-oyl chloride (187 parts) in dry carbon tetrachloride (2370 parts). The reaction vessel is closed and stored at 35–40° F. for three days. The triethylamine hydrochloride is separated by filtering.

Gaseous anhydrous ammonia is bubbled into a 6.6% solution by weight of the acyl ethenone in carbon tetrachloride, the solvent removed under reduced pressure and the product carefully dried. The product analyzed for 2.68% nitrogen compared with 2.56% calculated for $C_{36}H_{68}O_2N$.

The product can be converted to the amidomethylpyridinium halide by the method illustrated in Example II.

The amide has the formula

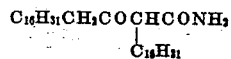

*Example IV*

Linseed oil acid chlorides (B. P. 180–3° C./5 mm.), a mixture of the $C_{18}$ multiply unsaturated straight chain acid chlorides, are converted to the acyl ethenones by adding, during a 5 minute period, triethylamine (25.5 parts) to a solution of the linseed oil acid chlorides (75 parts) in anhydrous ether (720 parts). Precipitation of thiethylamine hydrochloride begins immediately, the reaction mixture is placed under an atmosphere of nitrogen and, after 2 hours at room temperature, the reaction vessel is maintained at 35–40° F. for three days. The thiethylamine hydrochloride is separated by filtering, and the filtrate concentrated to 200 parts under reduced pressure.

Gaseous anhydrous ammonia is bubbled into a concentrated solution of the acyl ethenone in anhydrous ether. The precipitated amide is washed with ether, dried, and analyzed for 2.8% nitrogen whereas the value calculated for $C_{36}H_{63}O_2N$ is 2.6%.

The product can be converted to the amidomethylpyridinium halide by the method illustrated in Example II.

*Example V*

To triethylamine (52 parts) in anhydrous diethyl ether (1050 parts) is added dodecanoyl chloride (109 parts) and the reaction mixture is allowed to stand 24 hours before the amine hydrochloride is removed by filtering. Gaseous anhydrous ammonia is bubbled into the solution of the acyl ethenone having the formula

A quantitative yield of the alpha-dodecanoyl dodecanamide is obtained. After three recrystallizations from ethanol, the product melts at 110 to 111° C.

*Example VI*

Dodecanoyl chloride is converted to the acyl ethenone in the same manner as outlined in Example V. To an ether solution of the acyl ethenone is added aniline and the reaction mixture allowed to stand overnight. The following morning the precipitate which formed is filtered and recrystallized twice from ethanol. The alpha-dodecanoyldodecanilide has a melting point of 84 to 85° C. and analyzes for 78.46% carbon, 11.77% hydrogen and 3.18% nitrogen which compares with the values calculated for $C_{30}H_{51}O_2N$ of 78.72% carbon, 11.24% hydrogen and 3.06% nitrogen.

*Example VII*

Octadecanoyl chloride is converted to the acyl ethenone by adding triethylamine (101 parts) to a solution of octadecanoyl chloride (76 parts) in anhydrous benzene (880 parts), allowing the reaction mixture to stand for 24 hours at room temperature and separating the triethylamine hydrochloride formed by filtering. To the filtrate is added 1,5-aminonaphthol (40 parts). The reaction mixture is allowed to stand at room temperature for 60 hours, and is then heated for 1 hour at 40–50° C. The reaction mixture is washed with water containing a small amount of sodium sulfite dissolved in it. The product is recrystallized from ether-petroleum ether mixture. It has the formula

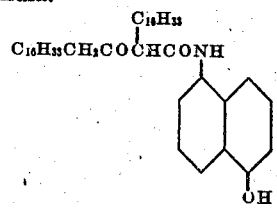

*Example VIII*

Alpha-octadecanoyloctadecanamide is prepared by adding triethylamine (233 parts) to a solution of octadecanoyl chloride (694 parts) in carbon tetrachloride (5760 parts), allowing the reaction mixture to stand for 16 hours, separating the aminehydrochloride by filtering, and bubbling into the filtrate an excess of anhydrous ammonia at room temperature whereupon the alpha-octadecanoyloctadecanamide crystallizes from solution. After recrystallization from ethanol-acetone mixture, the product, melting at 104° C., is obtained in a 95 per cent yield and contains 2.22% nitrogen, the value calculated for $C_{36}H_{71}O_2N$ being 2.55%.

The products of the present invention have the generic formula

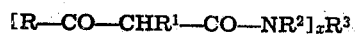

wherein R and $R^1$ have the values given above, are preferably both hydrocarbon and total at least nine and preferably twenty carbon atoms, $R^2$ is hydrogen or a monovalent organic radical, and $R^3$ is the non-amino residue of the basic compound having hydrogen on ammonia type nitrogen. $x$ represents the number of carbonamido residues in the compound and also the number of hydrogen bearing ammonia type nitrogens in the parent basic compound. $R^2$ may be aliphatic, cycloaliphatic, araliphatic or aromatic and is preferably hydrocarbon. $R^3$ may be all of these and may be monovalent or polyvalent (as in the diamines). $R^2$ and $R^3$ may be unsubstituted, or substituted as illustrated in Example VII. These substituted radicals may contain dye coupling nuclei as is further illustrated in Example VII. In addition to the aromatic dye coupling nuclei, both $R^2$ and $R^3$ can be long chain radicals useful in the preparation of intermediates for color photography.

The acyl ethanone intermediates for the preparation of the beta-ketocarbonamides may be prepared, as disclosed in my copending applications above identified, in anhydrous inert solvents by reaction of the corresponding acid chlorides with tertiary amines. Removal of the tertiary amine hydrochloride gives a solution of the acyl ethenone which can be reacted readily with an amine or with ammonia. Solvents suitable for acyl ethenone preparation are also admirably suited for the subsequent amidation reaction. Any solvent which dissolves but is inert toward acyl halides, tertiary amines or acyl ethenones is operable. Therefore a wide variety of solvents including ethers, aromatic or aliphatic hydrocarbons, aromatic and aliphatic chlorinated hydrocarbons can be employed, including anhydrous benzene, petroleum ether, petroleum naphtha, diethyl ether, di-isopropyl ether, carbon tetrachloride, trichloroethylene, toluene, and other related solvents that will not react with ammonia or amines under the conditions required for amidation. Chlorinated hydrocarbons not suitable as solvents include benzyl chloride and alpha- or beta-chloroethers.

The only acyl halides which can be converted to acyl ethenones and subsequently to amides falling within the scope of this invention are those containing one (—CH₂COX) group. Attached to the —CH₂COX group may be any radical inert towards tertiary amines, acyl halides, or acyl ethenones, such as the straight and branched chain alkyl, aryl, carbalkoxy or ether groups. The inert radicals attached to the —CH₂—CO—X group are so chosen that they total at least nine and preferably twenty carbons. Examples of such halides are hendecanoyl chloride, dodecanoyl chloride, tridecanoyl chloride, tetradecanoyl chloride, pentadecanoyl chloride, hexadecanoyl chloride, heptadecanoyl chloride, octadecanoyl chloride, 4-phenoxybutanoyl chloride, cyclohexylacetyl chloride, furyldecanoyl chloride, 3-phenylpropanoyl chloride, octadecen-9-oyl chloride, nonadecanoyl chloride, eicosanoyl chloride, docosanoyl chloride and hexacosanoyl chloride. Mixtures of acid chlorides can be used but the lower molecular weight acid chloride should contain at least 3 carbon atoms. Any acyl ethenone of the formula

R—CH₂—CO—CR'=CO wherein R and R' are as above may be used.

In the preparation of the amides, any basic compound having hydrogen on ammonia type nitrogen may be employed including ammonia, hydrazine, hydroxylamine, and amines having at least one hydrogen on the amino nitrogen. While amines, etc. having other groups reactive with the acyl ethenones may be employed, it is preferred that the basic ammonia type compound have only the =NH grouping reactive with acyl ethenones.

Amidation with ammonia and with primary amines produces the most desirable products, for when the resulting amide nitrogen is hydrogen bearing, subsequent reaction with paraformaldehyde, an anhydrous hydrohalogen acid, and a tertiary amine produces products that are useful as water repellents and as textile treating agents. Amidation is effected by adding any of the amines described above in an anhydrous form to a solution of the acyl ethenone. The presence of a solvent is not necessary, however, for the amidation reaction. The solvent may be removed under reduced pressure at a low temperature and the remaining acyl ethenone reacted directly with the amine in the absence of a solvent. If the amine is low boiling and the excess can be removed at low temperature under reduced pressure, the resulting amide can be used in any subsequent reaction without further purification or can be recrystallized from a suitable solvent. Amides prepared in solvents frequently precipitate from these solvents and may be used in subsequent reaction without further purification, or can be recrystallized from suitable solvents. Some of the amides, however, have been found to be soluble in the solvents in which they were prepared. In these cases the solvent is removed at low temperatures under reduced pressure, and again the amide can be used as isolated or can be purified by recrystallization from a suitable solvent. Amines suitable for amidating the acyl ethenones include methylamine, ethylamine, ethanolamine, propylamine, butylamine, isobutylamine, cyclohexylamine, pentylamine, cyclopentylamine, hexylamine, heptylamine, octylamine, nonylamine, decylamine, hendecylamine, dodecylamine, tridecylamine, tetradecylamine, pentadecylamine, hexadecylamine, heptadecylamine, octadecylamine, nonadecylamine, eicosylamine, heneicosylamine, docosylamine, hentriacontylamine, hexacontylamine, aniline, p-hydroxyaniline, naphthylamine, aminophenanthrene, aminoanthracene, aminochrysene, dimethylamine, diethylamine, dibutylamine, N-methylhexylamine, N-methylcyclohexylamine, piperidine,, morpholine, N-methylaniline, p-methoxy-N-methylaniline, pyrrole, pyrroline, pyrrolidine, 1,2,3-dioxazole, 1,3,2-dioxazole, 1,2,4-dioxazole, 1,3,4-dioxazole, indole, isoindole, 1,2-benzisoxazine, dipropylamine, dipentylamine, di-isobutylamine, N-methyloctadecylamine, N-methylheptadecylamine, N-ethyleicosylamine, N-methylheneicosylamine, N-methyldocosylamine, N-methylhexacosylamine, dioctadecylamine, didodecylamine, and dipentylamine, ethylenediamine, trimethylenediamine, tetramethylenediamine, pentamethylenediamine, hexamethylenediamine, beta-methylhexamethylenediamine, beta-phenylhexamethylenediamine, decamethylenediamine, tridecamethylenediamine, bigesimethylenediamine, dobigesimethylenediamine, m-diaminobenzene, 1,5-diaminonaphthalene, 3,6-dioxa-1,8-diamino-octane, heptamethylenediamine, nonamethylenediamine, octamethylenediamine, hendecamethylenediamine, dodecamethylenediamine, tetradecamethylenediamine, pentadecamethylenediamine, hexadecamethylenediamine, heptadecamethylenediamine, octadecamethylenediamine, nonadecamethylenediamine, N,N'-dimethylhexamethylenediamine, N,N' - didodecamethylenedobigesimethylenediamine, piperazine, N,N'-dimethyl-1,3-diaminobenzene, N,N'-diethylethylenediamine, N,N'-dimethylpropylenediamine, N,N'-dimethylbutylenediamine, N,N'-dimethylpentamethylenediamine, N,N'-dimethylheptamethylenediamine, N,N'-dimethyloctamethylenediamine, N,N'-dimethylnonamethylenediamine, N,N'-dimethyldecamethylenediamine, N,N'-dimethyloctadecamethylenediamine, N-methyl-1,4-diaminobenzene, N-methylhexamethylenediamine, N-methylethylenediamine, 4-aminopiperidine, N-methylpropylenediamine, N-ethylbutylenediamine, N-heptyltetradecamethylenediamine, N-propyldecamethylenediamine, N-methyloctadecamethylenediamine, and N-methyloctamethylenediamine. The term "aliphatic hydrocarbon monamine having hydrogen on amino nitrogen" is used to designate a monoamine which, apart from the amino nitrogen and hydrogen attached thereto, is aliphatic hydrocarbon.

The products of this invention are useful intermediates in the synthesis of water repellents, textile treating agents, and other products of commercial importance.

The above description and examples are intended to be illustrative only. Any modification of or variation therefrom which conforms to the spirit of the invention is intended to be included within the scope of the claims.

What is claimed is:
1. A beta-ketocarbonamide of the formula

R—CH₂—CO—CHR¹—CO—NHR² wherein R, R¹ and R² are monovalent aliphatic hydrocarbon radicals and R¹ and R² total at least nine carbon atoms.

2. A beta-ketocarbonamide of the formula

R—CH₂—CO—CHR¹—CO—NHR² where R and R¹ are alkyl radicals totalling at least nine carbon atoms.

3. Process which comprises reacting an acyl ethenone of the formula

R—CH₂—CO—CR¹=CO wherein R and R¹ are monovalent aliphatic hydrocarbon radicals totalling at least nine carbon atoms with a basic compound having a hydrogen bearing ammonia type nitrogen of the class consisting of ammonia and aliphatic hydrocarbon monoamines having hydrogen on amino nitrogen.

4. A beta-ketocarbonamide of the formula

R—CH₂—CO—CHR¹—CO—NH₂ where R and R¹ are monovalent aliphatic hydrocarbon radicals totalling at least twenty carbon atoms.

5. Process of claim 3 wherein the basic compound is ammonia.

6. Process of claim 3 wherein the basic compound is an amine.

7. Process of claim 3 wherein the acyl ethenone is one obtained from at least one fatty acid chloride.

8. Process of claim 3 wherein the acyl ethenone is obtained from a mixture of fatty acid halides.

9. A beta-ketocarbonamide of the formula

R—CH₂—CO—CHR¹—CO—NHR² wherein R and R¹ are monovalent aliphatic hydrocarbon radicals totalling at least nine carbon atoms and R² is a member of the class consisting of hydrogen and monovalent aliphatic hydrocarbon radicals.

10. Alpha-octadecanoyloctadecanamide.

JOHN CARL SAUER.

CERTIFICATE OF CORRECTION

Patent No. 2,323,938.  July 13, 1943.

JOHN CARL SAUER.

It is hereby certified that error appears in the printed specification of the above numbered patent requiring correction as follows: Page 5, first column, line 32, claim 2, for that portion of the formula reading "$NHR^2$" read --$NH_2$--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.